(12) United States Patent
Koenitzer et al.

(10) Patent No.: US 9,853,407 B2
(45) Date of Patent: Dec. 26, 2017

(54) BRUSH ASSEMBLY

(71) Applicant: Helwig Carbon Products, Inc., Milwaukee, WI (US)

(72) Inventors: Jeffrey D. Koenitzer, Elm Grove, WI (US); Marvin Herche, Waukesha, WI (US)

(73) Assignee: Helwig Carbon Products, Inc., Milwaukee, WI (US)

( * ) Notice: Subject to any disclaimer, the term of this patent is extended or adjusted under 35 U.S.C. 154(b) by 315 days.

(21) Appl. No.: 14/847,389

(22) Filed: Sep. 8, 2015

(65) Prior Publication Data

US 2017/0070020 A1    Mar. 9, 2017

(51) Int. Cl.
*H01R 39/12* (2006.01)
*H02K 11/40* (2016.01)

(52) U.S. Cl.
CPC .......... *H01R 39/12* (2013.01); *H02K 11/40* (2016.01)

(58) Field of Classification Search
CPC .................................. H01R 39/12; H02K 11/40
See application file for complete search history.

(56) References Cited

U.S. PATENT DOCUMENTS

| | | | |
|---|---|---|---|
| 1,277,497 A | 9/1918 | Starker et al. | |
| 1,460,152 A | 6/1923 | Dean | |
| 3,017,529 A | 1/1962 | Helwig | |
| 4,983,873 A | 1/1991 | Tanaka et al. | |
| 5,397,952 A * | 3/1995 | Decker | H01R 39/415 310/239 |
| 5,463,264 A * | 10/1995 | Koenitzer | H01R 39/415 310/242 |
| 6,917,135 B1 * | 7/2005 | Yu | H01R 39/41 310/239 |
| 7,982,357 B2 * | 7/2011 | Harris | H01R 39/381 310/239 |
| D795,192 S * | 8/2017 | Koenitzer | D13/122 |
| 2003/0151328 A1 | 8/2003 | Cutsforth et al. | |
| 2008/0100170 A1 | 5/2008 | Rehm et al. | |
| 2015/0303635 A1 | 10/2015 | Wei et al. | |
| 2017/0070020 A1 * | 3/2017 | Koenitzer | H01R 39/12 |

OTHER PUBLICATIONS

Brochure entitled "Helwig Carbon—The Bearing Protector," available at www.helwigcarbon.com, Sep. 2013 (2 pages).

* cited by examiner

*Primary Examiner* — Robert W Horn
(74) *Attorney, Agent, or Firm* — Michael Best & Friedrich LLP

(57) ABSTRACT

A brush assembly including a housing having a first opening, a second opening, and an interior space defined between the first opening and the second opening. The brush assembly further includes a removable cover at least partially received within the interior space and covering the first opening, and a brush at least partially received within the interior space and extending from the second opening. The brush is operable to move between an extended position and a retracted position. More of the brush is received within the interior space in the retracted position than in the extended position. The brush assembly further includes a contact received within a mounting aperture formed in the removable cover. The contact is electrically connected to the brush. The brush assembly also includes a spring coupled to the removable cover. The spring biases the brush into the extended position.

20 Claims, 6 Drawing Sheets

BRUSH ASSEMBLY

BACKGROUND

The present invention relates to a brush assembly for sliding electrical contacts such as those used in, for example, electric motors, and more specifically a brush assembly for use in a grounding circuit.

Induced and static charges on motor shafts commonly cause failures due to current flowing through the bearings and other components. With reference to FIG. 1, a prior art brush assembly 10 for a grounding circuit is mounted to an axial drive end 14 of an electric motor 18 by fasteners 22. The brush assembly 10 includes a brass housing 26 and a brush 30 that is biased by a spring 34 to extend from the brass housing 26. The brush 30 is biased to remain in contact with a rotating shaft 38 of the electric motor 18. A contact 42 electrically connects the brush 30 to the brass housing 26, and the brass housing 26 is electrically connected to the axial end 14 of the motor 18 by the fasteners 22. As such, an electrical connection is formed between the shaft 38 and the axial end 14 of the motor 18, which is commonly electrical ground.

SUMMARY

In one aspect, the invention provides a brush assembly including a housing having a first opening, a second opening, and an interior space defined between the first opening and the second opening. The brush assembly further includes a removable cover at least partially received within the interior space and covering the first opening, and a brush at least partially received within the interior space and extending from the second opening. The brush is operable to move between an extended position and a retracted position. More of the brush is received within the interior space in the retracted position than in the extended position. The brush assembly further includes a contact received within a mounting aperture formed in the removable cover. The contact is electrically connected to the brush. The brush assembly also includes a spring coupled to the removable cover. The spring biases the brush into the extended position.

In another aspect, the invention provides a brush assembly including a housing having a first opening, a second opening, and an interior space defined between the first opening and the second opening. The housing includes an adjustable mount. The brush assembly also includes a removable cover at least partially received within the interior space and covering the first opening; and a brush at least partially received within the interior space and extending from the second opening. The brush is operable to move between an extended position and a retracted position, wherein more of the brush is received within the interior space in the retracted position than in the extended position. The brush is formed from a silver graphite composition. The brush assembly further includes a contact received within a mounting aperture formed in the removable cover. The contact is electrically connected to the brush. The brush assembly also includes a constant-force spring coupled to the removable cover, the spring biasing the brush into the extended position. A grounding circuit is formed between the brush and the contact and the grounding circuit is insulated by the holder and the removable cover.

Other aspects of the invention will become apparent by consideration of the detailed description and accompanying drawings.

Figure 1:
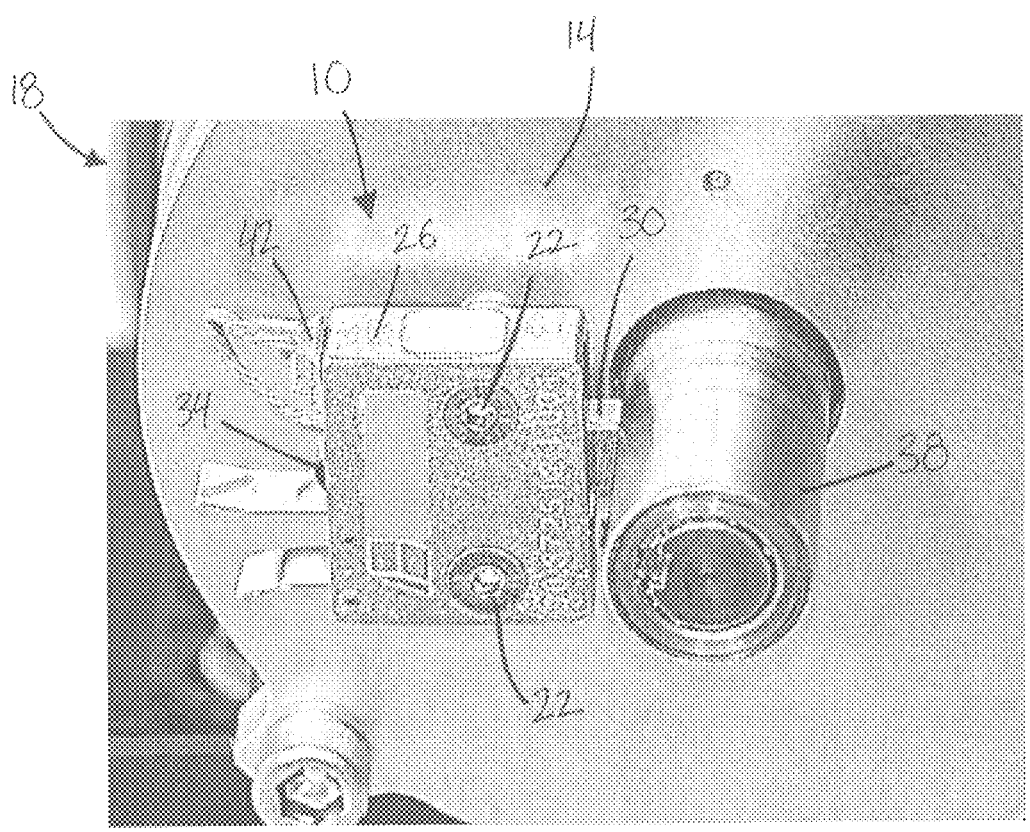
FIG. 1 is a perspective view of a prior art brush assembly mounted to an axial end of an electric motor having a brush in contact with the electric motor shaft.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

With reference to FIGS. 2-5, a brush assembly 110 according to one embodiment of the invention includes a housing 114, a removable cover 118, and a brush 122. The housing 114 includes a first opening 126 (FIG. 4), a second opening 130 (FIG. 5), and an interior space 134 defined between the first opening 126 and the second opening 130. The removable cover 118 is at least partially received within the interior space 134 and the removable cover 118 covers the first opening 126. The removable cover 118 includes a stem portion 138 that is received within a cover track 142 formed in the housing 114. The removable cover 118 also includes a lip 146 and the removable cover 118 is secured to the housing 114 with a releasable press-fit engagement between the lip 146 and the housing 114. More specifically, in the illustrated embodiment, the lip 146 includes a protrusion 150 that is received within a groove 154 formed in the housing 114. The protrusion 150 received within the groove 154 secures the removable cover 118 to the housing 114, but is easily overcome (i.e., separated) by a user attempting to remove the removable cover 118 from the housing 114. When the removable cover 118 is removed from the housing 114, the interior space 134 of the housing 114 is exposed.

Figure 2:
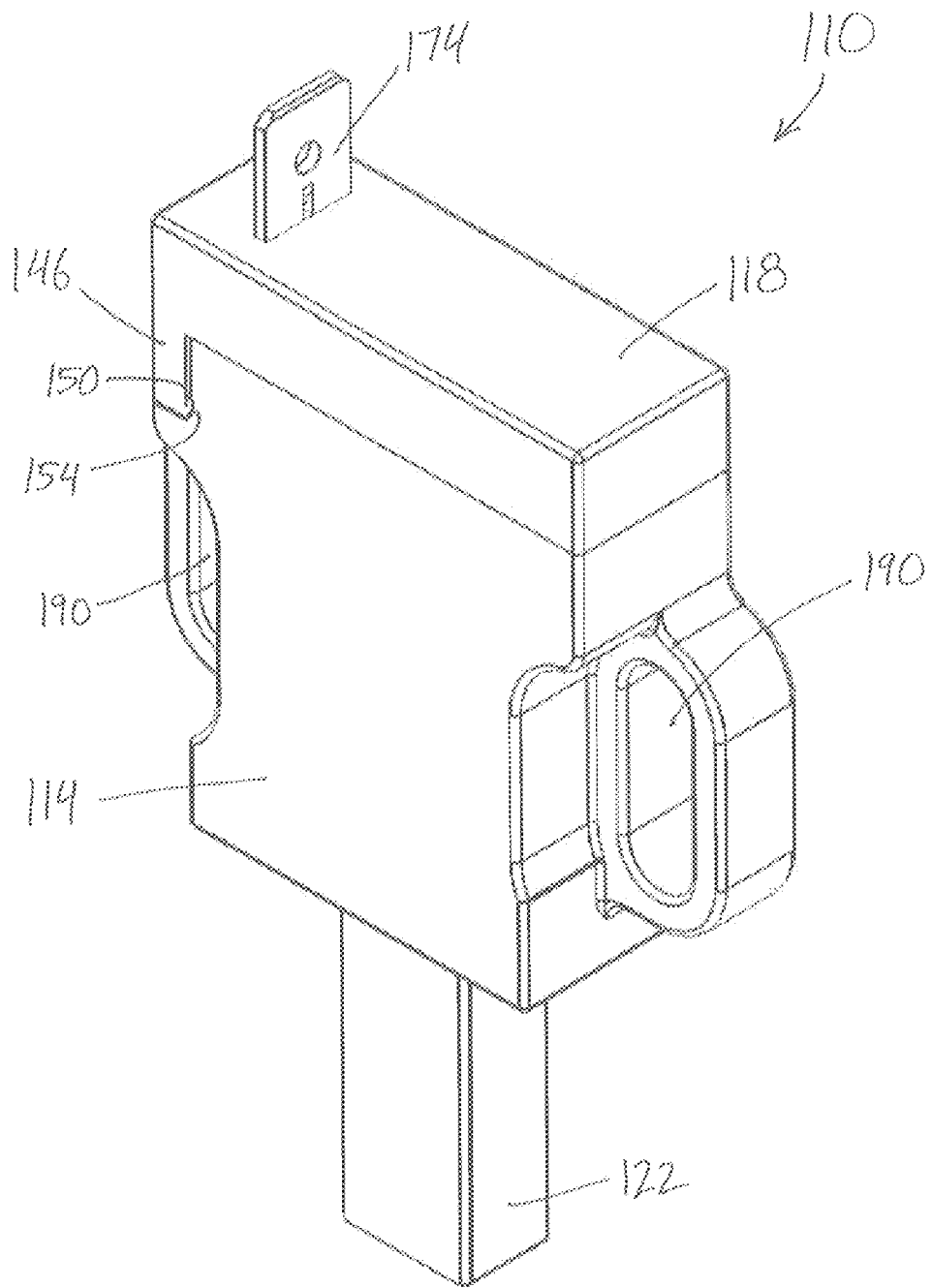
FIG. 2 is a perspective view of a brush assembly with a brush in an extended position.
Figure 3:
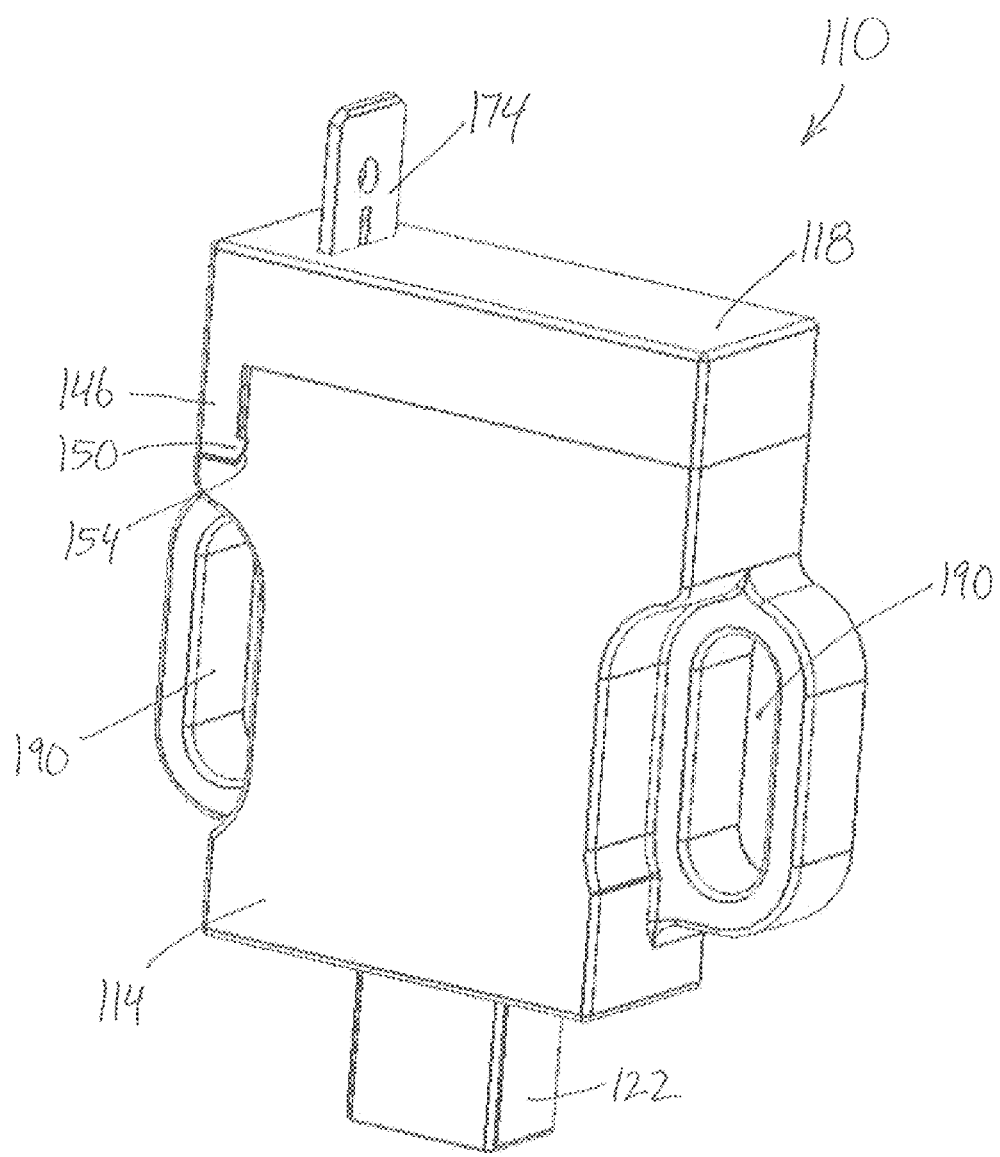
FIG. 3 is a perspective view of the brush assembly of FIG. 2 with the brush in a retracted position.

With references to FIGS. 2-5, the brush 122 is at least partially received within the interior space 134 and extending from the second opening 130. The brush 122 is operable to move between an extended position (FIG. 2) and a retracted position (FIG. 3). More of the brush 122 is received within the interior space 134 when the brush 122 is in the refracted position than when the brush 122 is in the extended position. The brush 122 is formed from silver graphite. In some embodiments, the brush 122 is 50% silver and 50% graphite by weight. The silver content in the brush 122 provides low contact resistance for electrical grounding, and the graphite content in the brush 122 provides low friction for extended life. The housing 114 further includes a brush track 158 in which the brush 122 is slidably received. In other words, the brush 122 slides along the brush track 158 as the brush 122 moves between the extended and retracted positions.

Figure 4:
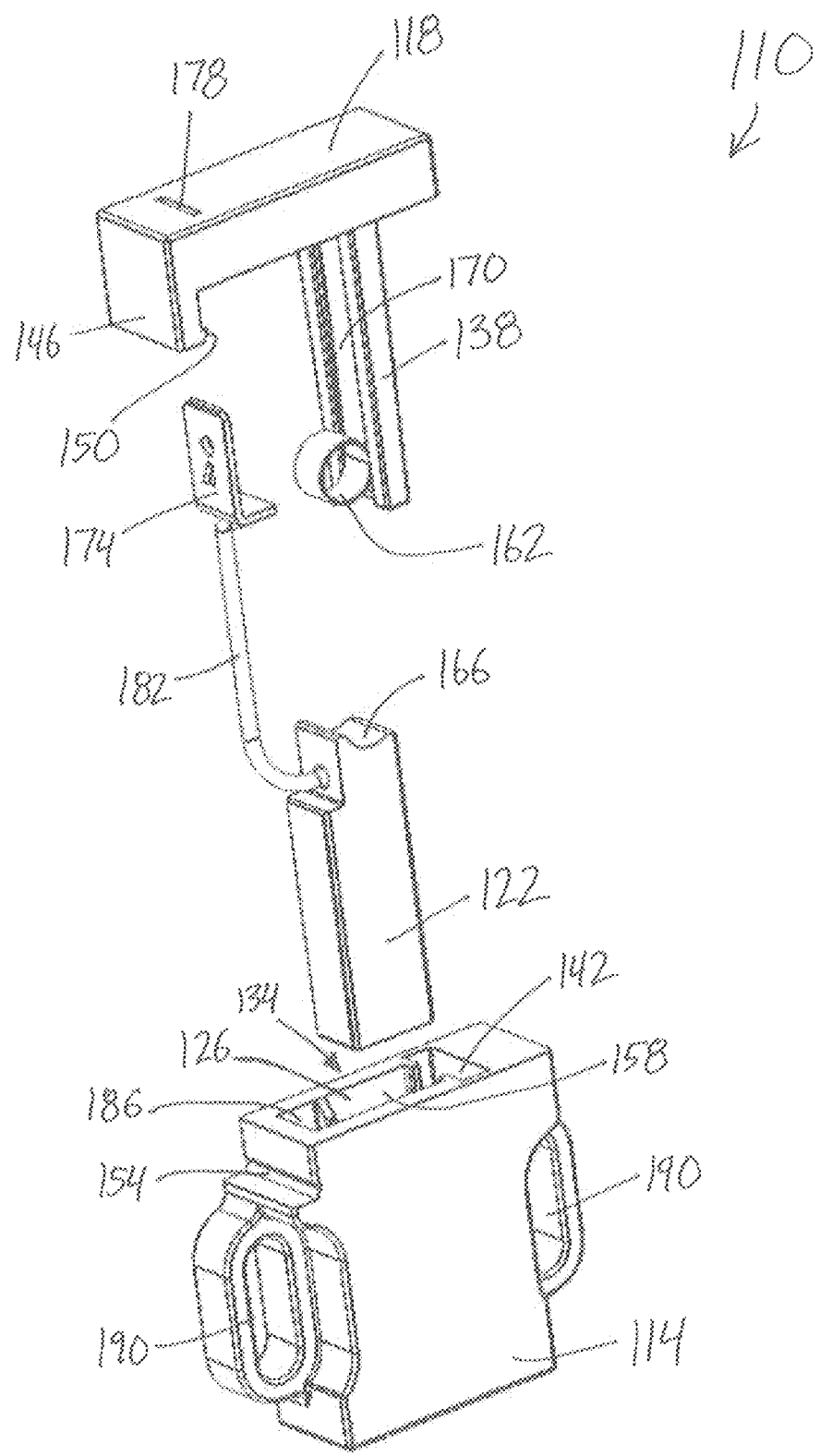
FIG. 4 is an exploded top view of the brush assembly of FIG. 2.
Figure 5:
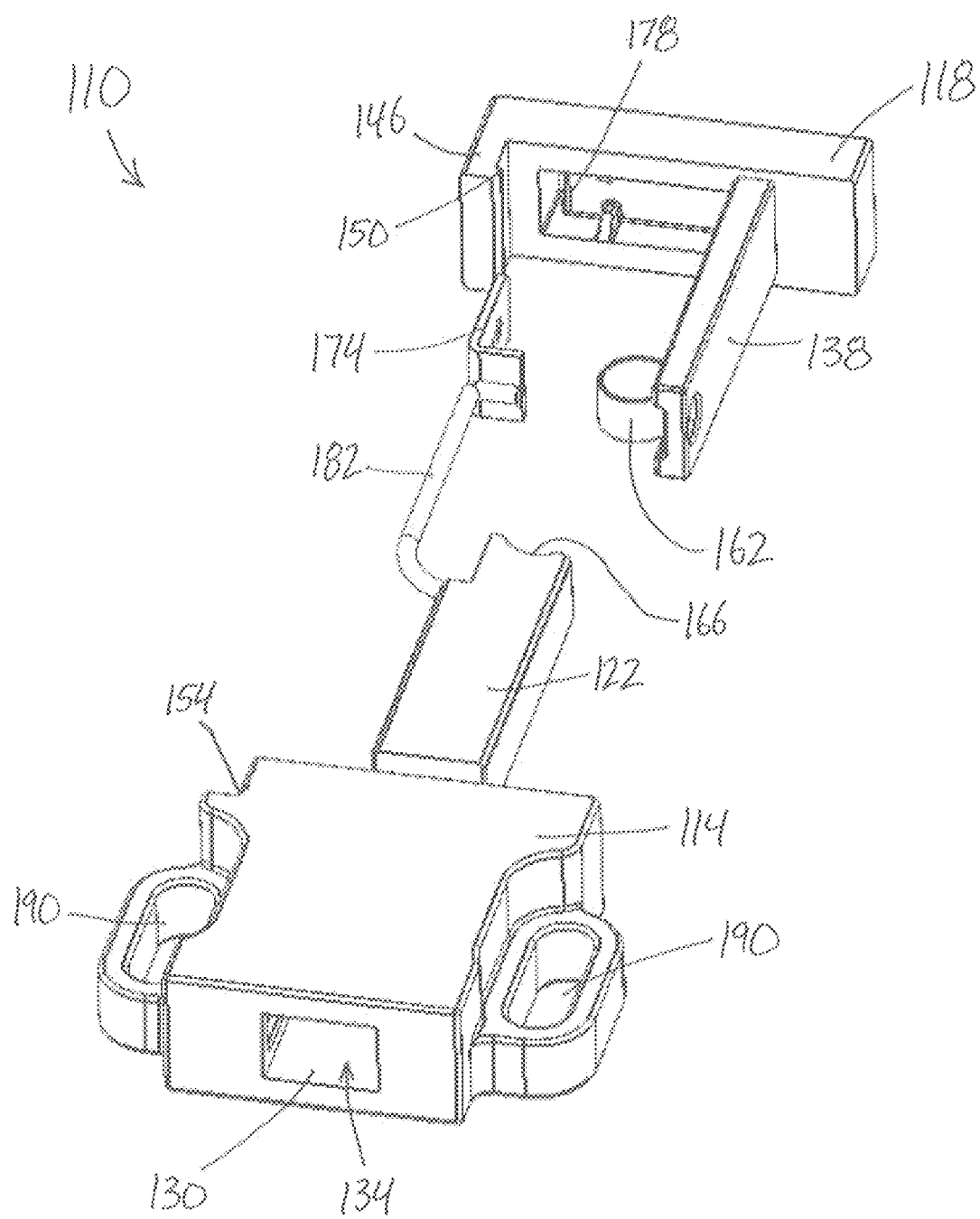
FIG. 5 is an exploded bottom view of the brush assembly of FIG. 2.

With reference to FIGS. 4 and 5, the brush assembly 110 further includes a spring 162 biasing the brush 122 into the extended position (FIG. 2). The spring 162 is coupled to the removable cover 118. In the illustrated embodiment, the spring 162 is a constant-force spring and is coupled to the stem portion 138 of the removable cover 118. In the illustrated embodiment, the spring 162 directly contacts a rear surface 166 of the brush 122, and the rear surface 166 is curved to correspond to the spring 162 coil. As the brush 122 retracts further into the housing 114, the brush 122 causes the spring 162 to partially unfurl along a spring track 170 formed in the stem portion 138. The spring 162 provides a biasing force on the brush 122 that is optimized for low contact resistance and long life.

When the removable cover 118 is secured to the housing 114, the spring 162 is encapsulated within the housing 114, and removing the removable cover 118 provides access to the spring 162. In other words, when the removable cover 118 is on the housing 114, the spring 162 is protected from exterior debris and environmental damage, but once the removable cover 118 is removed a user has access to the spring 162 for inspection, maintenance, and replacement purposes. In addition, once the removable cover 118 is removed, a user may similarly inspect the brush 122 for wearing or replace the brush 122 completely. As such, the removable cover 118 improves the serviceability of the brush assembly 110, while protecting internal components from environmental hazards.

With continued reference to FIGS. 4 and 5, the brush assembly 110 further includes a contact 174 received within a mounting aperture 178 formed in the removable cover 118. The contact 174 is electrically connected to the brush 122 via a wire 182, and the contact 174 is ultimately connected to an external ground (e.g., a motor chassis or frame). The housing 114 further includes a contact track 186 that receives the contact 174 and the wire 182. As such, the electrical connection (e.g., the wire 182) between the contact 174 and the brush 122 is protected within the housing 114, but the removable cover 118 can be removed in order to provide access to the electrical connection. The housing 114 and removable cover 118 are made from an insulating material (e.g., a phenolic resin). As such, a grounding circuit is formed between the brush 122 and the contact 174, but the portions of the contact 174, the brush 122, and the wire 182 contained by the housing 114 and the removable cover 118 within the grounding circuit are insulated.

Moreover, the combination of the housing 114 and the removable cover 118 seal the brush 122, the spring 162, and the wire 182 from contaminants and particulate that could disturb the function of these parts. While at the same time, the removable cover 118 provides the user access to the brush 122, the spring 162, and the wire 182 should they need to be inspected, replaced, maintained, or otherwise accessed. Therefore, the removable cover 118 provides a multi-purpose functional advantage over the prior art.

Figure 6:
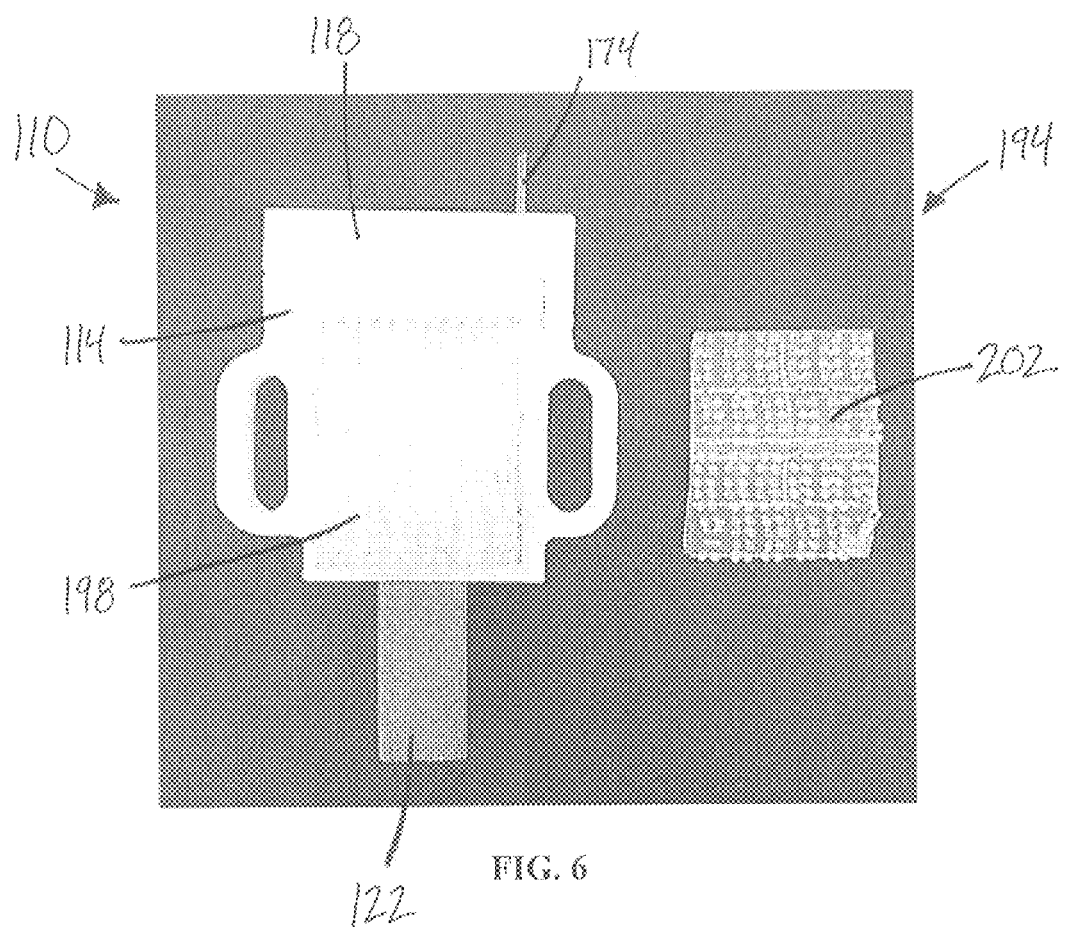
FIG. 6 is a rear view of the brush assembly of FIG. 2 including an alternative adjustable mount.

With reference to FIGS. 2-5, the brush assembly 110 further includes an adjustable mount. In the illustrated embodiment, the adjustable mount is formed on the housing 114 as slots 190. The slots 190 are configured to receive a fastener (not shown) within the slot 190 for securing the housing 114 to, for example, an axial end of a motor. The fasteners can move within the slots 190 to provide adjustable mounting prior to fully tightening the fasteners. Being able to adjustably mount the brush assembly 110 is important for correctly orientating and positioning the brush 122 relative to a motor shaft, for example. With reference to FIG. 6, an alternative adjustable mount is illustrated as a reclosable fastener 194. More specifically, a first portion 198 of the reclosable fastener 194 is secured to the housing 114 with an adhesive and a second, corresponding portion 202 of the reclosable fastener 194 is secured to the area in which the brush assembly 110 is desired with an adhesive. The reclosable fastener 194 is, for example, Dual Lock™ commercially available from 3M™.

Various features and advantages of the invention are set forth in the following claims.

What is claimed is:

1. A brush assembly comprising:
 a housing including a first opening, a second opening, and an interior space defined between the first opening and the second opening;
 a removable cover at least partially received within the interior space and covering the first opening;
 a brush at least partially received within the interior space and extending from the second opening, the brush operable to move between an extended position and a retracted position, wherein more of the brush is received within the interior space in the retracted position than in the extended position;
 a contact received within a mounting aperture formed in the removable cover, the contact electrically connected to the brush; and
 a spring coupled to the removable cover, the spring biasing the brush into the extended position.

2. The brush assembly of claim 1, wherein the spring is encapsulated within the housing.

3. The brush assembly of claim 1, wherein the removable cover is removed from the housing to expose the interior space of the housing.

4. The brush assembly of claim 3, wherein removing the removable cover provides access to the spring.

5. The brush assembly of claim 1, wherein the housing further includes a brush track in which the brush is slidably received.

6. The brush assembly of claim 1, wherein the removable cover includes a stem portion that is received within a cover track formed in the housing.

7. The brush assembly of claim 6, wherein the spring is coupled to the stem portion of the removable cover.

8. The brush assembly of claim 1, wherein the housing further includes a track that receives the contact.

9. The brush assembly of claim 1, wherein the brush is formed from silver graphite.

10. The brush assembly of claim 9, wherein the brush is made from 50 percent silver and 50 percent graphite by weight.

11. The brush assembly of claim 1, wherein the spring is a constant-force spring.

12. The brush assembly of claim 1, wherein the holder is made from a phenolic resin.

13. The brush assembly of claim 1, wherein a grounding circuit is formed between the brush and the contact and the grounding circuit is insulated by the holder and the removable cover.

14. The brush assembly of claim 1, further comprising an adjustable mount.

15. The brush assembly of claim 14, wherein the adjustable mount includes a slot formed on the housing configured for receiving a fastener within the slot.

16. The brush assembly of claim 14, wherein the adjustable mount includes a reclosable fastener.

17. The brush assembly of claim 1, wherein the removable cover further includes a lip and the removable cover is secured to the housing with a releasable press-fit engagement between the lip and the housing.

18. A brush assembly comprising:
a housing including a first opening, a second opening, and an interior space defined between the first opening and the second opening; wherein the housing includes an adjustable mount;
a removable cover at least partially received within the interior space and covering the first opening;
a brush at least partially received within the interior space and extending from the second opening, the brush operable to move between an extended position and a retracted position, wherein more of the brush is received within the interior space in the retracted position than in the extended position; wherein the brush is formed from silver graphite;
a contact received within a mounting aperture formed in the removable cover, the contact electrically connected to the brush,
a constant-force spring coupled to the removable cover, the spring biasing the brush into the extended position;
wherein a grounding circuit is formed between the brush and the contact and the grounding circuit is insulated by the holder and the removable cover.

19. The brush assembly of claim 18, wherein the removable cover is removed from the housing to expose the interior space of the housing.

20. The brush assembly of claim 18, wherein the removable cover includes a stem portion that is received within a cover track formed within the housing and the constant-force spring is coupled to the stem portion of the removable cover.

* * * * *